(12) United States Patent
Shove et al.

(10) Patent No.: X5111
(45) Date of Patent: May 13, 1828

(54) TANNING,MANUFACTURING HIDES

(76) Inventors: Ebenezer Shove; Thomas Hunt

Ebenezer Shove and Thomas Hunt
Letters Patent.

The Schedule referred to in these Letters Patent and making part of the same containing a description in the words of the said Ebenezer Shove and Thomas Hunt themselves of their improvement in tanning and manufacturing Hides into Leather.

This improvement consists in the process of working off the hair with greater facility and with more safety than in any other mode of sweating, and at the same time with less reduction and relaxation of the fibres of the Hides. For this purpose hang or suspend the hides singly by one edge in a tight Place, vat or pit prepared for the purpose occasionally changing them edge for edge after a day or two. A small opening or vacancy should be left in each end of the place, vat or pit that the air may circulate to carry off the warm rarified air When there are indications of too much heat, care must be taken to drench the hides with cold water. The manner of hanging or suspending the hides as above mentioned prevents them from pressing upon each other and thereby the sweating process is consequently carried on more regularly and uniformly, and without the necessity of applying any heat, so that it may be denominated the cool sweating process Witnesses
A. H. Dennis
J. Halsey Ebenezer Shove
Thomas Hunt Exd
[illegible]

238 words